Sept. 13, 1927.

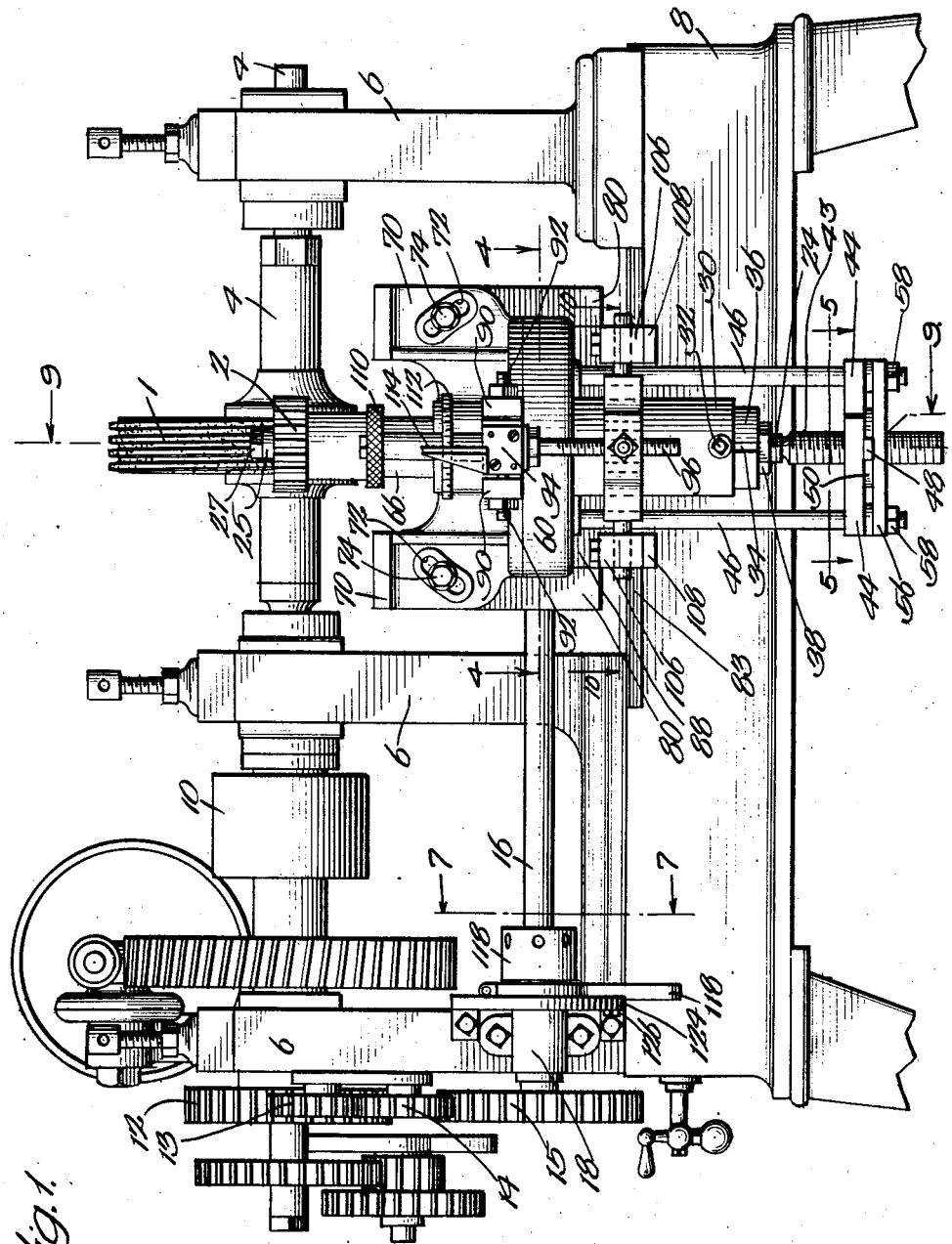

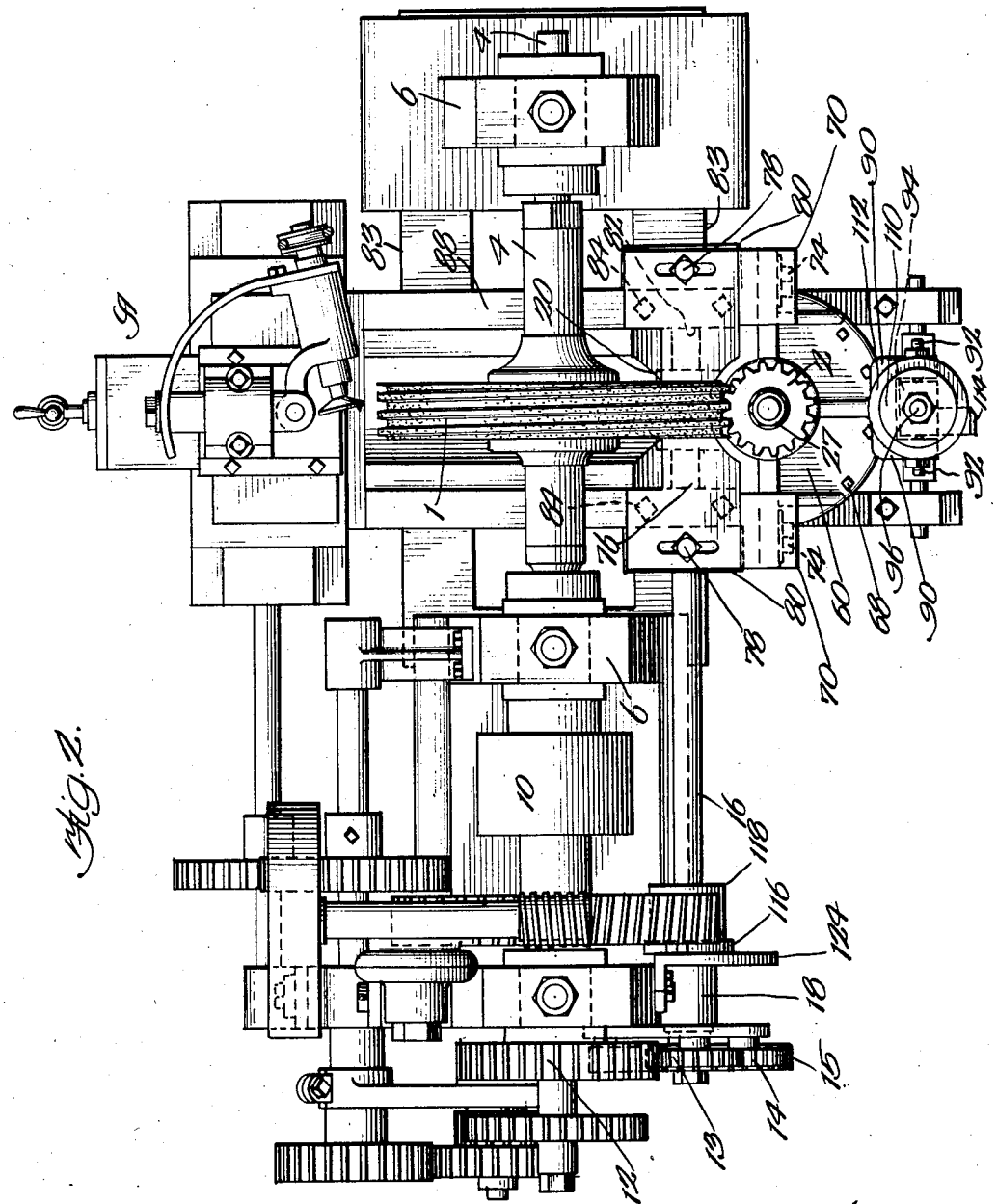

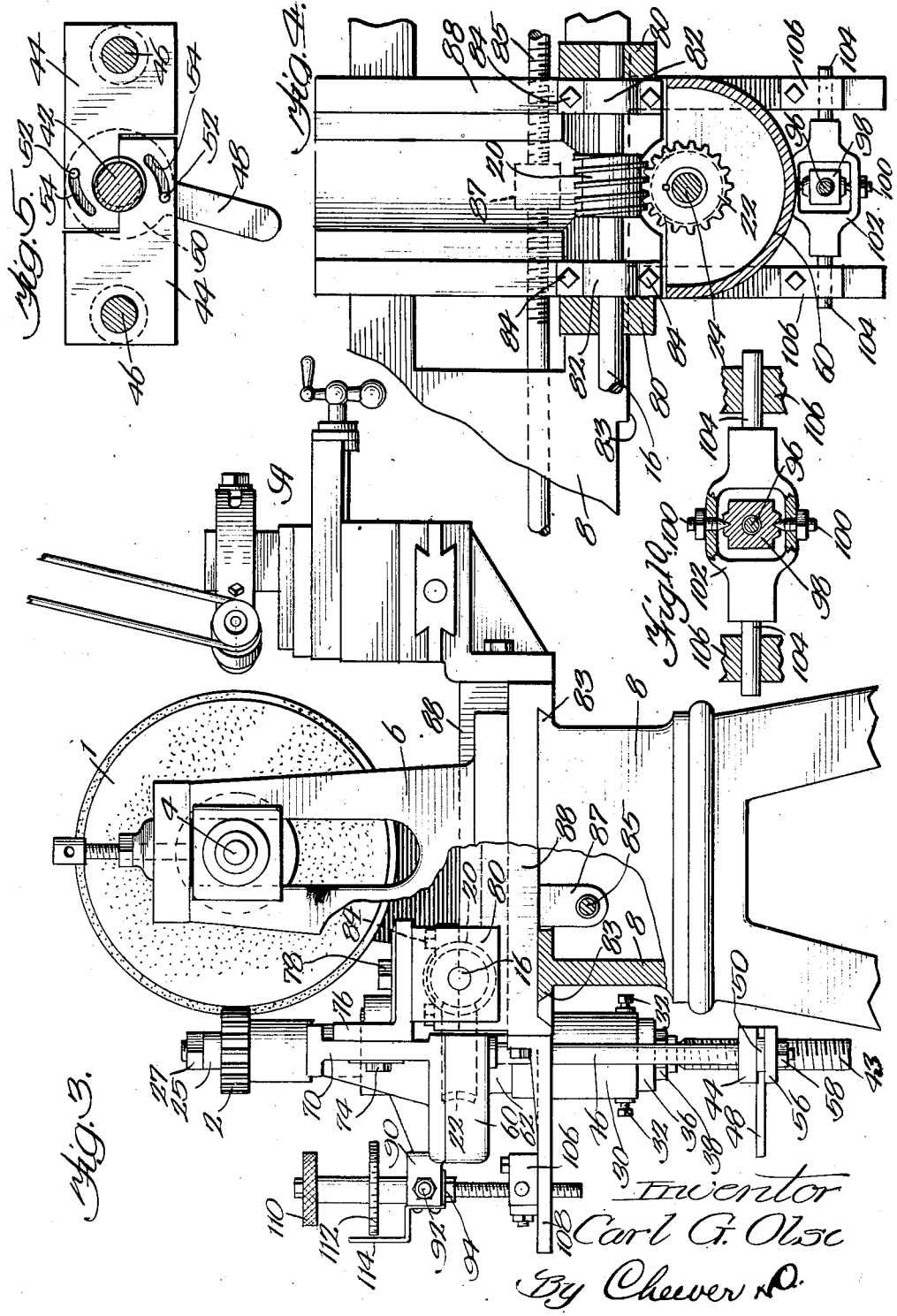

C. G. OLSON 1,642,554

GEAR GENERATING MACHINE

Filed March 7, 1923   5 Sheets-Sheet 4

Inventor:
Carl G. Olson
By Cheever & Cox Attys

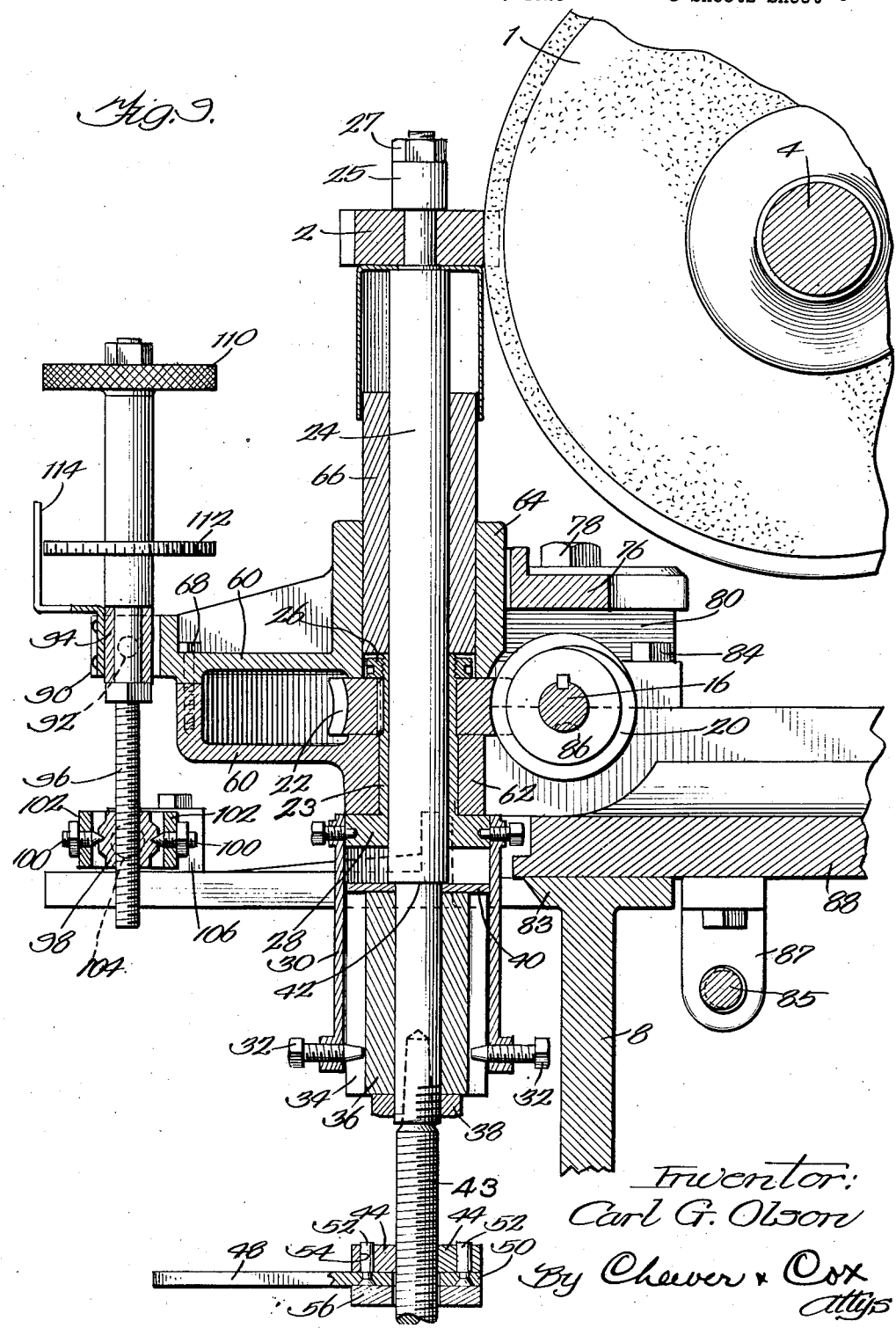

Patented Sept. 13, 1927.

1,642,554

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GEAR-GENERATING MACHINE.

Application filed March 7, 1923. Serial No. 623,529.

My invention relates to gear generating machines operating upon the hobbing principle and while it may employ an ordinary cutting hob I have employed and illustrated what may be regarded as a grinding hob, the same having an abrasive helicoidal worm capable of generating gear teeth by grinding instead of by ordinary cutting. The general object of the invention is to provide a machine of this character capable of producing accurate and uniform work without requiring great skill on the part of the operator. Among the more specific objects it is my purpose to provide a simple form of mechanism for operating the tool and work spindles in timed relation; second, to provide in a gear generating machine with crosswise spindles means for producing relative feed between the work and the generating tool in a direction parallel to the axis of the work; third, to arrange the tool and work spindle crosswise and mount one of them (in the present design the work spindle) pivotally so that it may be swingable to bring the work closer together or farther apart to increase or decrease the depth to which the generated gear teeth will be cut (specifically, in the illustrated case the work spindle is journaled in a housing or frame which is pivotally mounted on a shaft remote from the work and arranged crosswise of the work spindle and hence the work is bodily movable, radially, and along an arcuate path, toward and from the tool axis; as designed this pivot shaft is also the one which drives the work spindle); fourth, to provide means for securing the work to the work spindle approximately in correct angular position to coordinate with the helical element on the tool and supplemental means for then obtaining a micrometer adjustment of the work angularly to accurately coordinate with the helical element on the tool; fifth, to provide means, in a machine of this type, with crossed tool and work spindles and axial feed of the work, for varying the angle between the spindles to correspond to various helix angles in the different tools which may be employed. I accomplish my objects by the mechanism illustrated in the accompanying drawings in which Figure 1 is a front elevation of the machine.

Figure 2 is a plan view of the machine.

Figure 3 is an end view looking toward the left in Fig. 2. A part of the frame work is broken away to better reveal the construction of some of the parts.

Figure 4 is a plan section on the line 4—4 Figure 1.

Figure 5 is a plan section on the line 5—5 Figure 1. This shows the split nut carried at the lower end of the mechanism which feeds the work spindle axially.

Figure 6 is an end view of the machine looking toward the right, Figure 1.

Figure 7 is a sectional view on the line 7—7 Figure 1, and shows the mechanism for producing the final angular adjustment of the work spindle about its axis.

Figure 8 is a sectional view on the line 8—8 Figure 7.

Figure 9 is a sectional elevation on the line 9—9 Figure 1.

Figure 10 is a plan section on the line 10—10, Figure 1. It shows part of the mechanism by which the work may be swung closer to or farther from the axis of the grinder hob.

Like numerals refer to like parts throughout the several views.

In the form illustrated the tool 1 is, as previously stated, a grinding helicoid operating upon the hobbing principle. I shall, therefore, for simplicity refer to it by the generic term "hob" although specifically it is a grinding hob instead of a cutting hob. In operating, it works upon the generating principle and grinds to finished form the teeth of the gear which constitute the work. It will be understood that in practice the teeth of the work will be roughed out prior to being brought to my present machine. The tool 1, therefore, corresponds to a finishing hob capable of truing up the teeth after they have been roughed out. In my machine the tool is rotated by a spindle 4 journaled in pedestals 6 rising from the bed or main frame 8. The spindle is driven at high speed by a belt pulley 10 or other suitable form of power device. Rigidly fastened on this spindle is a gear 12 which, operating through a train of gears 13, 14 and 15, drives a shaft 16. This shaft is provided with suitable bearings 18, and operates both as a driving shaft for driving the work spindle and as a pivot for the frame or housing in which the work spindle is mounted. This will presently be explained more in detail. For identification shaft 16 may be referred to as a "countershaft". Rigidly fastened to it is a worm 20 which cooperates with a worm gear 22 rigidly connected to the work spindle 24 as shown, for example, in Figures 4 and 9. The work 2, which in the present case is a roughed out spur gear, is secured to the upper end of the work spindle, for example, by a sleeve 25 clamped down by a nut 27. By thus clamping the work to the spindle it may at once be brought to approximately the correct angular position to coordinate with the helicoid on the tool. The final accurate position may be obtained by a separate micrometer adjustment which will be hereinafter explained.

The connection between the worm gear 22 and the work spindle is such that the rotation of the worm gear will cause the spindle to rotate, but the spindle will be free to slide longitudinally relatively to said worm gear. The particular mechanism selected for this purpose is well illustrated in Figure 9 in which it will be seen that the worm gear 22 is keyed to a sleeve 23 in which the spindle is journaled and in which it is slidable longitudinally to provide for feeding the work past the tool. A locking ring 26 screws on to the upper end of the sleeve and holds the worm gear in fixed position upon the sleeve. This worm gear bears upon the hub 62 of a secondary frame or housing 60, presently to be described. At the lower end of the sleeve is an annular flange 28 to which is fastened a housing 30. Near the lower end this housing carries cap screws 32, the inner ends whereof project into slots or keyways 34 in a sleeve 36 which encircles the spindle and is rigidly secured to it by means of a locknut 38 which forces it against a plate 40 which abuts a shoulder 42 formed on the spindle. The result of this construction is that the work spindle is forced to rotate in unison with the worm gear 22 and hence in timed relation with the tool spindle 4 and yet is free to move axially (in the present case vertically) to produce the feed of the work relatively to the tool.

The vertical feed just mentioned is caused by mechanism illustrated in the lower portion of Figures 1, 3 and 9 and also in Figure 5. A feedscrew 43 is rigidly connected to work spindle 24, for example by a tapered drive fit as illustrated in the lower portion of Figure 9. The reason that the feed screw is preferably a separable element is that this affords an opportunity to substitute feed screws having different pitches to cause different rates of feed. Said feed screw works in a split nut formed of two halves 44 illustrated in detail in Figure 5. These half nuts are swingable in a horizontal plane being pivoted upon rods 46. They are rotated about their pivots by cam mechanism which includes a handle 48 projecting from the side of a disc 50 from which rise pins 52 which work in cam slots 54 formed in said half nuts. The disc 50 rotates about screw 43 as an axis and rides upon cross bar 56 supported by nuts 58 upon the lower ends of rod 46. The construction is such that by swinging handle 48 in one position or the other it will cause the half nuts to swing into and out of engagement with the feed screw.

The rods 46 are fastened at their upper ends to the said frame or housing 60 and are supported by it. This frame is illustrated in section in Figures 4 and 9. It has a hub 62 which forms a bearing for the worm gear 22 and sleeve 23 as previously mentioned. It also has a hub 64 located above worm gear 22 and carrying a sleeve 66 in which the upper portion of work spindle 24 is journaled. By preference the secondary frame is formed in two parts secured together by bolts 68 as shown at the left portion of Figure 9. This frame thus forms a support for the work spindle 24 and parts associated therewith. It is pivotally supported upon countershaft 16 in the manner now to be described.

Rising from the upper portion of frame 60 are integral brackets 70 having arcuate slots 72 centered at the central point of tangency of worm 20 and worm gear 22. Clamping bolts 74 pass backward through these slots into brackets 76 which are secured by bolts 78 to bearing blocks 80 journaled upon shaft 16. Located adjacent to the bearing blocks 80 are bearing caps 82 as best shown in Figures 3 and 4. These are secured by bolts 84 to the bearings 86 formed in a cross head 88 supported on the main frame 8 of the machine.

The cross head is slidable upon ways 83 on the main frame and its position is controlled by an adjusting screw 85 shown, for example, in Figures 3, 4 and 9. This screw works in a nut 87 bolted to the under side of the crosshead.

It will be observed that shaft 16 is supported at one end by the bearings 18 and at the other by bearings 86. It will also be observed that the bearings 86 prevent endwise movement of the bearing blocks 80, thus confining the frame 60 in the proper position longitudinally on shaft 16, but permitting said frame to rock on said shaft for adjusting the work closer to or farther from the axis of the tool 1. The mechanism for making this adjustment will now be described.

Projecting forward from the frame 60 is a fork 90 which supports pointed screws 92 which form trunnions for a bearing sleeve 94 in which an adjusting screw 96 is journaled. This is shown in detail in the left portion of Figure 9. Screw 96 works in a nut 98 which is pivotally supported upon the point bearings 100 supported upon a bar 102 having trunnions 104 at the ends rorotatably supported in bearings 106 as illustrated at the lower portion of Figure 2 and in detail in Figure 10. The bearings 106 are far enough apart to afford a limited amount of endwise movement of block 102 to permit arcuate adjustment of the frame 60 to conform to various helix angles in the grinding hob. The bearings 106 are in the form of blocks mounted upon stationary brackets 108 projecting forward from the crosshead 88 best shown at the left portion of Figure 3. It will be evident that by rotating the screw 96 in one direction or the other the work 2 will be swung toward or from the grinding hob. Screw 96 is provided with a knurled head 110 at the upper end by which it may be rotated. It is also provided with a graduated disc 112 which cooperates with pointer 114 for determining the degree of adjustment.

I have provided means for adjusting the shaft 16 longitudinally to produce a fine angular adjustment of the work spindle. The mechanism is shown in detail in Figures 6, 7 and 8, and will now be described.

The bearing 18 previously mentioned is extended at the inner end and is externally screw threaded to cooperate with an internally screw threaded hub 116 which is provided with a lever 118 by which it is angularly controlled. An annular nut 118' screws onto the hub 116 and is internally shouldered to engage the flange 120 of a sleeve 122 which is pinned or otherwise rigidly secured to shaft 16. It will be evident that when hub 116 is angularly adjusted it will screw forward or backward along bearing 18 and pull shaft 16 with it. The movement called for is slight as it merely constitutes a final adjustment after the work has been fastened to the work spindle. Lever 118 is secured in the proper angular position by a slotted quadrant 124 which is concentric with shaft 16. A clamping bolt 126 secures the lever in the position desired.

I have provided means by which the grinding hob may be dressed or trued from time to time but as this forms no part of the present invention it need not be described in detail. The theory of operation will be found in my prior Patent 1,501,229 issued July 15, 1924. The mechanism as a whole is indicated by A at the upper portion of Figure 2 and at the right end of Figure 3. It is also illustrated in Figure 6. This mechanism is never used at the same time that the grinding hob acts upon the work and hence may be considered as an alternative part of the machine.

In operation, the pulley 10 drives the tool spindle 4 and tool 1. The gears 12, 13, 14 and 15 transmit this motion at reduced speed to the countershaft 16 on which the worm 20 is fastened. This drives the worm gear 22 and hence causes the work spindle 24 to rotate in harmony with the lead of the thread upon the grinder. The gear to be ground is clamped in approximately the correct angular position upon work spindle 24, after which if any final adjustment is required it is accomplished by loosening the clamping bolt 126 (see Figures 7 and 8) and rotating the lever handle 118. This shifts the shaft 16 slightly which imparts a slight rotary movement to the worm gear 22 and work spindle 24. This may be regarded as a micrometer adjustment for lever handle 118 may be rotated a considerable angle without producing much angular movement of the work. Under normal operating conditions the split nut 44, 44 engages the threads of the feed screw 43 with the result that as the work spindle rotates it causes the feed screw to rotate and gradually raise the work spindle 24. This causes the work to travel tangentially to the tool for feeding the work past the tool in accordance with usual hobbing practice. After the work spindle has risen to such height that the gear wheel is entirely finished it may be quickly lowered by swinging the handle 48 to unlocking position, thus causing the two halves of the split nut 44 to disengage the feed screw and permit the housing and work spindle to drop directly to initial position.

If it is desired to bring the work closer to or further from the grinder the operator rotates the hand wheel 110 in the proper direction. This swings the frame 60 about the shaft 16 as a pivot and swings the work toward or from the grinder, the work traveling in an arcuate path concentric with shaft 16. This may be regarded as a micrometer adjustment because wheel 110 may be rotated through a considerable angle without producing much bodily movement of the work towards or from the grinder. The primary purpose of this adjustment is to compensate for the wear of the grinder so that as the grinder wears away the work may be kept in contact with it. This adjustment may also be regarded as regulating the depth of the cut—that is, the depth to which the abrasive helicoid will enter into the gear which constitutes the work.

If it is desired to change the inclination of the work spindle to accommodate a grinder having a different helix angle the change may be accomplished by loosening the bolts 74 and rotating the uprights 70 and frame 60 until the proper angle is obtained. The parts are then set in proper position by re-tightening the bolt.

From the foregoing it will be seen that my machine causes the tool spindle and the work spindle to rotate in proper timed relation and that for the purpose of grinding the teeth of gears the machine is quite universal in the sense of being capable of adapting itself to grinders having a variety of diameters and helix angles; also that the machine is capable of fine adjustment in bringing the gear wheel to the proper angular position and to the proper distance from the axis of the tool spindle.

Having thus described my invention what I claim as new and desire to secure by Letters Patent is:—

1. In a machine of the class described, the combination of a generating tool spindle, a work spindle arranged crosswise of the tool spindle, a frame in which the work spindle is both rotatable and is longitudinally slidable for causing relative feed between the work and the tool, and a counter shaft rotating in timed relation with the tool spindle, said shaft being geared to the work spindle for rotating it and forming a pivot for said frame, said shaft being parallel to the tool spindle whereby angular movement of the frame will move the work toward or from the tool.

2. A machine of the class described having a main frame, a tool spindle mounted therein and having a stationary axis, a work spindle, a secondary frame for holding the work spindle approximately crosswise of the tool spindle, a shaft on which the secondary frame is pivoted to enable the work to be swung toward or from the tool, said shaft and the work spindle being geared together, and means for rotating said shaft and the tool spindle in timed relation.

3. A machine of the class described having a main frame, a tool spindle mounted in fixed position in said frame, a work spindle, a secondary frame for holding the work spindle approximately crosswise of the tool spindle, a countershaft mounted in the main frame and geared directly to the work spindle for rotating it, means operated directly by the work spindle for moving it longitudinally in its bearings, said secondary frame being pivotally mounted on said countershaft, and means for causing the tool spindle and drive shaft to rotate in timed relation.

4. In a machine of the class described the combination of a generating tool spindle, a work spindle arranged crosswise of the tool spindle, a frame in which the work spindle is both rotatable and is axially shiftable to cause relative feed between the tool and the work, a countershaft rotating in timed relation with the tool spindle, said shaft having a gear wheel fastened upon it, gearing for connecting said gear wheel to the work spindle for rotating the latter, the frame being pivoted upon the countershaft for enabling the work to be swung toward and from the tool, and means for moving the work spindle longitudinally in the frame in accord with its rotary motion.

5. In a machine of the class described the combination of a generating tool spindle, a work spindle arranged crosswise of the tool spindle, a frame in which the work spindle is both rotatable and is longitudinally shiftable to cause relative feed between the tool and the work, a countershaft rotating in timed relation with the tool spindle, said shaft and work spindle having gears which intermesh directly with each other, the frame being pivoted upon the countershaft for enabling the work to be swung toward and from the tool, and means for feeding the work spindle longitudinally, said means including two cooperating threaded elements, one of which is rigidly fastened to the work shaft and the other is mounted on said frame.

6. In a machine of the class described, the combination of a tool spindle and a work spindle arranged transversely to each other, a power driven counter shaft geared to the work spindle for driving it, said counter shaft also being geared to the tool spindle, a frame forming a bearing for the work spindle and pivotally mounted on said counter shaft so as to be rockable about it as an axis, and a lead screw in line with the work spindle for moving it longitudinally as it rotates to thereby produce relative feed between the tool and the work.

7. In a machine of the class described, the combination of a tool spindle and a work spindle arranged transversely to each other, a power driven counter shaft geared to the work spindle for driving it, said counter shaft also being geared to the tool spindle, a frame forming a bearing for the work spindle and pivotally mounted on said counter shaft so as to be rockable about it as an axis, a lead screw in line with the work spindle for moving it longitudinally as it rotates to thereby produce relative feed between the tool and the work, and screw mechanism for varying the position of the work spindle about the countershaft as an axis to vary the distance of the work axis from the axis of the tool spindle.

8. A machine tool having a tool spindle for supporting a generating tool, a work spindle arranged crosswise of the tool spindle, a frame in which the work spindle is both rotatable and longitudinally shiftable to cause relative feed between the tool and the work, a countershaft arranged parallel to the tool spindle and forming a pivotal support for said frame, said countershaft being geared to the work spindle for rotating it, and means driven by the countershaft for shifting the work spindle axially to cause relative feed between the work and the tool.

9. In a machine of the class described, the combination of a tool spindle, a work spindle, a countershaft geared to the tool spindle, a worm on said countershaft meshing with a worm gear on said spindle for transmitting rotary movement to the work spindle to drive it in timed relation with the tool spindle, means for clamping the work to the work spindle for holding it approximately in proper angular position with respect to its own axis, and means for shifting the countershaft longitudinally a slight distance to thereby produce a fine angular movement of the work wheel about its axis and consequently of the work about its axis.

10. A machine operating upon the hobbing principle and employing a rotary tool having a helical acting element on it, said machine having a tool spindle, a work spindle arranged transversely thereto, means for rotating said spindles in timed relation, and a bearing for the work spindle angularly adjustable in a plane approximately tangential to the tool whereby the work axis may be adjusted to various helix angles of the helical elements upon the tool.

11. A machine operating upon the hobbing principle in which the tool is rotary and provided with a helical acting element, said machine having a tool spindle, a work spindle arranged transversely to it, means including a countershaft and gearing for causing said spindles to rotate in timed relation, and a bearing for the work spindle angularly adjustable in a plane approximately tangential to the tool whereby the work axis may be adjusted to various helix angles of the helical elements upon the tool, said bearing being also adjustable angularly about the countershaft as an axis to vary the distance of the work axis from the tool axis.

12. A machine tool having a tool spindle for supporting a generating tool, a work spindle arranged crosswise of the tool spindle, a frame in which the work spindle is both rotatable and longitudinally shiftable, a countershaft geared to the work spindle for rotating it, said countershaft being parallel to the tool spindle and remaining at a fixed distance from it during the completion of any given piece of work, said countershaft forming a support for the frame and a pivot about which the frame is angularly movable to increase the distance of the work from the tool spindle, and means actuated by the tool spindle for moving it longitudinally to produce relative feed between the work and the tool.

13. A machine tool having a tool spindle for supporting the generating tool, a work spindle arranged crosswise of the tool spindle, a countershaft interposed between the tool spindle and the work spindle, in that the work spindle is geared to the countershaft and through it to the tool spindle, a lead screw for causing the work spindle to shift longitudinally to feed the work past the tool, a frame pivotally mounted upon the countershaft and forming a support for the work spindle, the work spindle being both rotatable and longitudinally movable in said frame, and means for controlling the position of said frame angularly about the countershaft for increasing or decreasing the distance of the work from the tool spindle.

In witness whereof, I have hereunto subscribed my name.

CARL G. OLSON.